(12) United States Patent
Doerr et al.

(10) Patent No.: US 7,134,802 B2
(45) Date of Patent: Nov. 14, 2006

(54) LATCH ASSEMBLY

(75) Inventors: Alan B. Doerr, Magnolia, TX (US); Minh H. Nguyen, Katy, TX (US); Kelly Kennedy Smith, Spring, TX (US)

(73) Assignee: Hewlett-Packard Development Company, LP., Houston, TX (US)

( * ) Notice: Subject to any disclaimer, the term of this patent is extended or adjusted under 35 U.S.C. 154(b) by 130 days.

(21) Appl. No.: 10/828,604

(22) Filed: Apr. 21, 2004

(65) Prior Publication Data

US 2005/0238421 A1 Oct. 27, 2005

(51) Int. Cl.
*F16D 1/00* (2006.01)
*A47F 5/00* (2006.01)

(52) U.S. Cl. ............... 403/322.1; 403/321; 403/322.1; 403/325; 211/175; 312/334.4

(58) Field of Classification Search ............... 403/321, 403/322.1, 322.4, 329, 325–327, 330; 292/82, 292/85, 87, 89, DIG. 11; 361/726, 732, 801; 211/26, 175; 312/265.1–265.6, 223.2, 334.4; 248/222.11, 222.12, 220.21
See application file for complete search history.

(56) References Cited

U.S. PATENT DOCUMENTS

| | | | | | |
|---|---|---|---|---|---|
| 46,472 | A | * | 2/1865 | Jenks | 292/85 |
| 230,476 | A | * | 7/1880 | Green | 292/85 |
| 1,014,755 | A | * | 1/1912 | Jette | 292/85 |
| 1,235,075 | A | * | 7/1917 | Stamm | 292/85 |
| 1,931,216 | A | * | 10/1933 | Zell | 292/85 |
| 2,948,560 | A | * | 8/1960 | Rop | 292/45 |
| 4,702,535 | A | * | 10/1987 | Beun | 312/308 |
| 5,119,980 | A | * | 6/1992 | Grim et al. | 292/85 |
| 5,510,957 | A | * | 4/1996 | Takagi | 361/814 |
| 5,823,644 | A | * | 10/1998 | Suh et al. | 312/223.2 |
| 5,860,302 | A | * | 1/1999 | James | 70/63 |
| 5,868,261 | A | * | 2/1999 | Collins et al. | 211/26 |
| 6,404,641 | B1 | | 6/2002 | Fisk et al. | |
| 6,450,597 | B1 | | 9/2002 | Bell et al. | |
| 6,637,847 | B1 | * | 10/2003 | Crisp et al. | 312/223.2 |
| 6,648,149 | B1 | | 11/2003 | Robertson | |
| 6,666,340 | B1 | * | 12/2003 | Basinger et al. | 211/26 |
| 6,693,798 | B1 | | 2/2004 | Conn et al. | |
| 6,893,061 | B1 | * | 5/2005 | Miller et al. | 292/303 |
| 6,978,903 | B1 | * | 12/2005 | Son et al. | 211/26 |

* cited by examiner

*Primary Examiner*—Robert J. Sandy
*Assistant Examiner*—Ruth C. Rodriguez

(57) ABSTRACT

A latch assembly to connect a component to a rack. The assembly comprises a latch spring and a lever that are connected to a component. The latch spring is moveable between an engaged and a disengaged position. In the engaged position the latch spring is engaged with a catch that is connected to a rack. In the disengaged position the latch spring is disengaged from the catch. The lever is rotatable about an axis of rotation between a latched position and an unlatched position. The rotation of the lever from the latched position to the unlatched position moves the latch spring from the engaged position to the disengaged position in a direction parallel to the axis of rotation.

12 Claims, 4 Drawing Sheets

US 7,134,802 B2

LATCH ASSEMBLY

BACKGROUND

A rack is a frame or cabinet for holding an array of computer components, such as servers, peripherals, storage units, and other electronic accessories. The individual components are mounted to the rack on rail assemblies. Although the components may be recessed within the rack, the rail assemblies allow the components to slide into and out of the rack for installation and maintenance purposes. For stability and security, it may be desirable to be able to latch the component in place to prevent the component from sliding along the rail assembly. Thus, a system supporting quick and simple latching of an individual component to a rack system may be advantageous.

SUMMARY

A latch assembly to connect a component to a rack. The assembly comprises a latch spring and a lever that are connected to a component. The latch spring is moveable between an engaged and a disengaged position. In the engaged position the latch spring is engaged with a catch that is connected to a rack. In the disengaged position the latch spring is disengaged from the catch. The lever is rotatable about an axis of rotation between a latched position and an unlatched position. The rotation of the lever from the latched position to the unlatched position moves the latch spring from the engaged position to the disengaged position in a direction parallel to the axis of rotation.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ."

DETAILED DESCRIPTION

The following discussion is directed to various embodiments of the invention. Although one or more of these embodiments may be preferred, the embodiments disclosed should not be interpreted, or otherwise used, as limiting the scope of the disclosure. In addition, one skilled in the art will understand that the following description has broad application, and the discussion of any embodiment is meant only to be exemplary of that embodiment, and not intended to intimate that the scope of the disclosure is limited to that embodiment.

Figure 1:
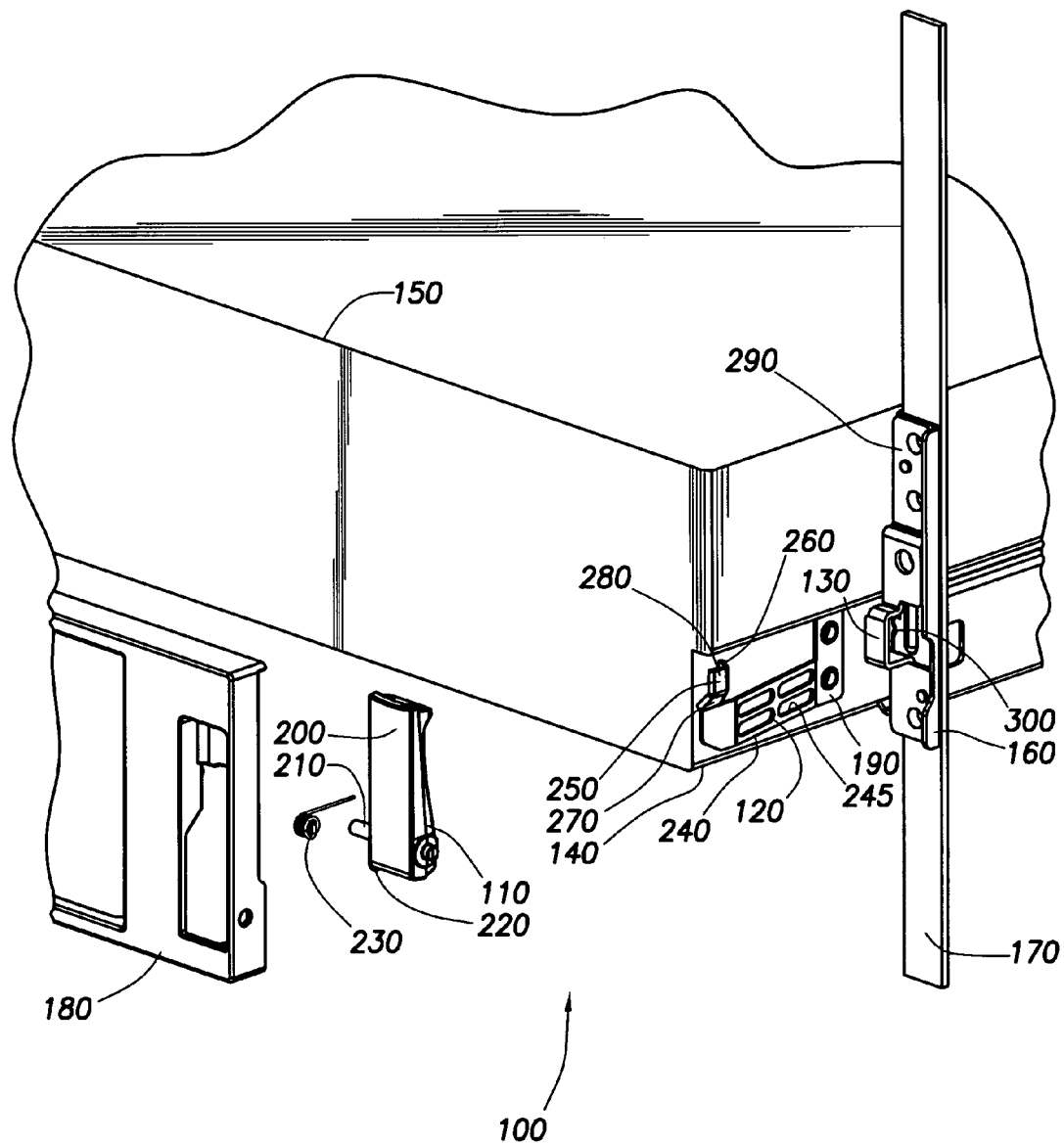
FIG. 1 shows an isometric exploded view of a latch assembly in accordance with embodiments of the invention.

Referring to FIG. 1, a latch assembly 100 comprises lever 110, latch spring 120, and catch 130. Latch assembly 100 operates so as to connect chassis 140 of component 150 to rail assembly 160 that is connected to rack 170. Lever 110 is rotatably mounted to bezel 180 of component 150. Latch spring 120 is attached to chassis 140 at fixed end 190. Catch 130 is attached to rail assembly 160. In certain embodiments, latch assembly 100 may also comprise torsion spring 230 that is operable to bias lever 110 to an upright position.

Figure 3:
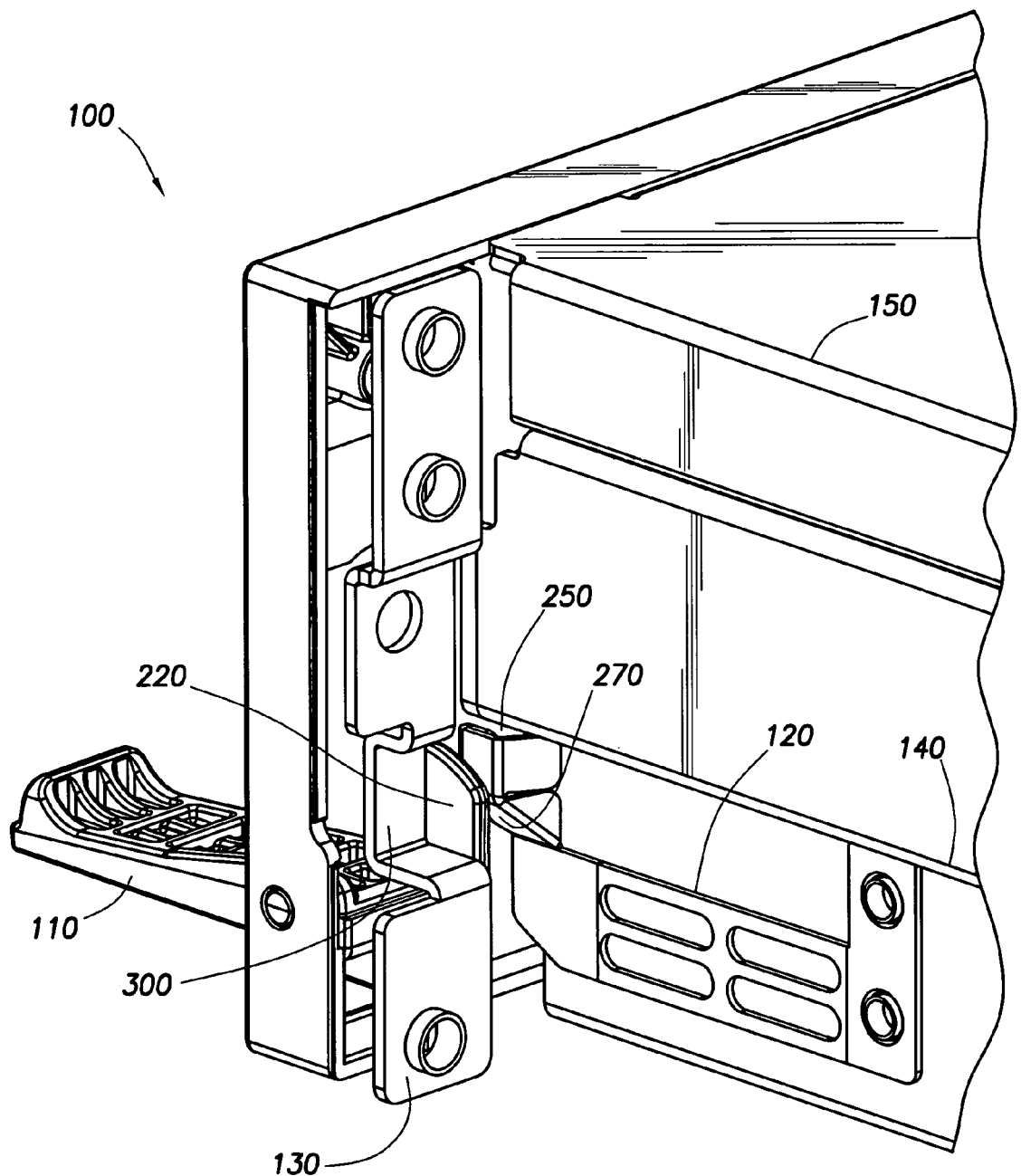
FIG. 3 shows an isometric view of a latch assembly in an unlatched position in accordance with embodiments of the invention.
Figure 4:
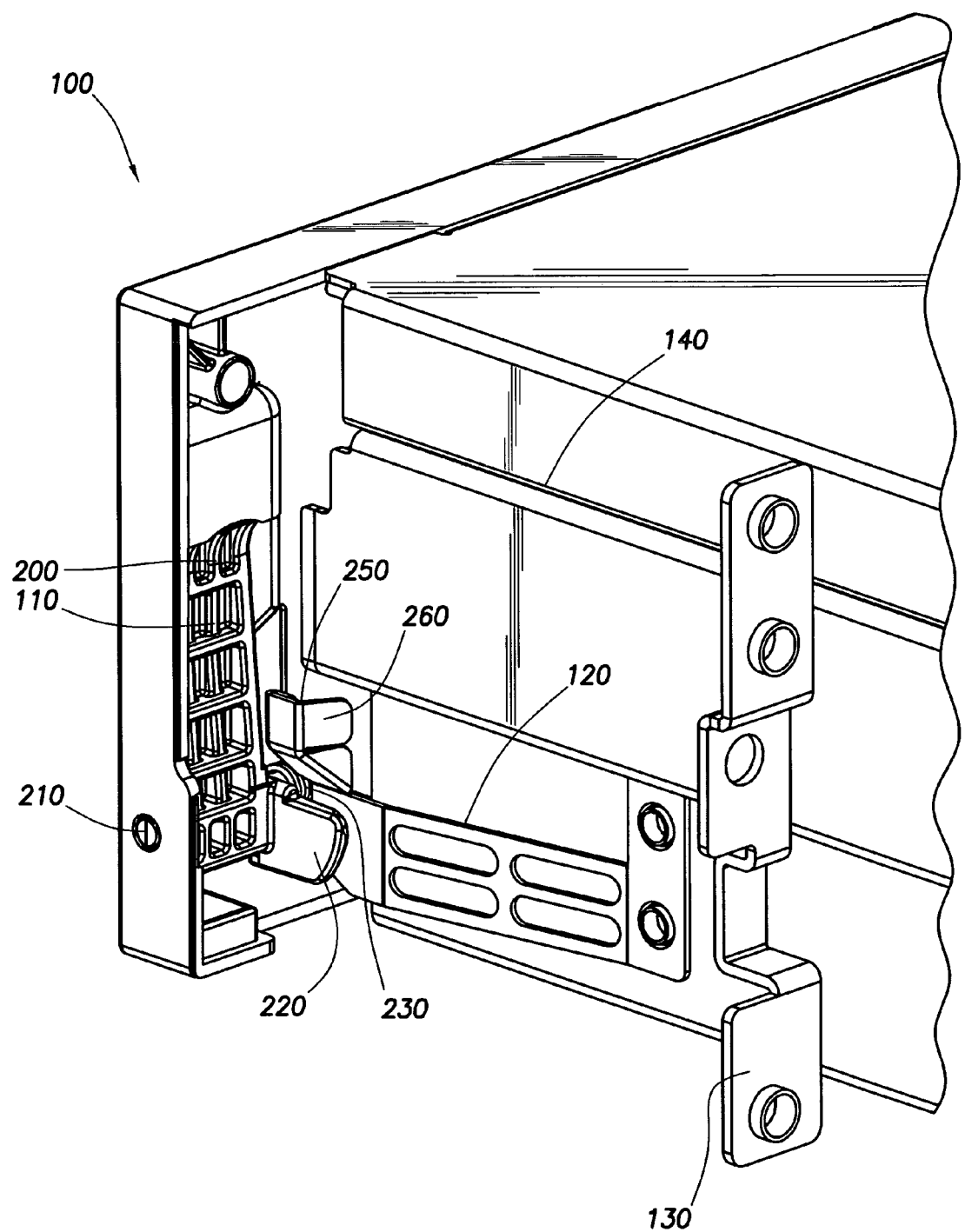
FIG. 4 shows an isometric view of a latch assembly in an installation position in accordance with embodiments of the invention.

Lever 110 comprises body 200, axle 210, and paddle 220 (see FIG. 4). Axle 210 rotatably engages bezel 180, or some other feature of component 150. As can be seen in FIG. 4, paddle 220 protrudes from body 200 in a direction that may be substantially perpendicular to the longitudinal axis of 200 body. Paddle 220 may be connected to body 200 in a position proximate to axle 210. Lever 110 is rotatable about axle 210 between an upright position (see FIG. 2) and an extended position (see FIG. 3). Lever 110 may be able to rotate about ninety degrees between the upright position and the extended position. When in the extended position paddle 220 of lever 110 may contact a stopping surface on chassis 140 or bezel 180. Lever 110 may be fully recessed within bezel 180 when in the upright position and may project from bezel 180 when in the extended position.

Latch spring 120 is a flat spring comprising a spring body 240 with a fixed end 190 and an engaging end 250. Fixed end 190 is fixably attached to chassis 140 of component 150. Spring body 240 extends from fixed end 190 outward and away from the side of chassis 140. Spring body 240 biases engaging end 250 to a position outboard of chassis 140. Spring body 240 may be a flat metal spring comprising apertures 245 or other features operable to control the flexibility of the spring body.

Figure 2:
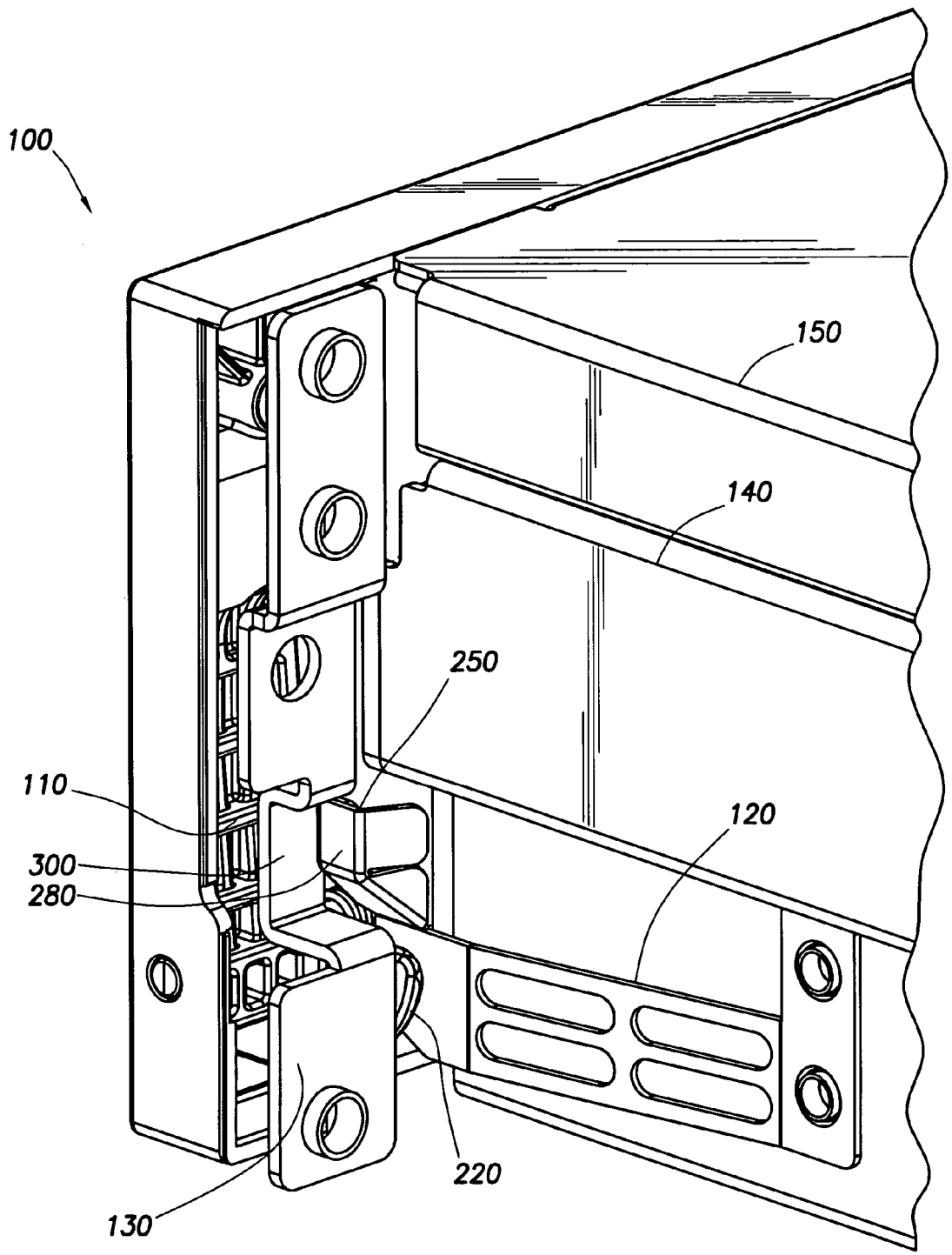
FIG. 2 shows an isometric view of a latch assembly in a latched position in accordance with embodiments of the invention.

Engaging end 250 comprises disengaging surface 270 (FIG. 3) and offset surface 280 (FIG. 2). Disengaging surface 270 extends upward from and at an angle to spring body 240. Offset surface 280 extends further upward from disengaging surface 270 but at a reduced angle and may be substantially parallel to fixed end 190. In some embodiments, engaging end 250 also comprises engaging surface 260 (FIG. 4), which extends from offset surface 280 in a direction towards chassis 140 and fixed end 190.

Catch 130 comprises elongate body 290 having receptacle 300. Catch 130 is attached to rail assembly 160 such that elongate body 290 is substantially parallel with bezel 180 of component 150. Receptacle 300 is formed between catch 130 and rail assembly 160 and is sized so as to accommodate at least a portion of the engaging end 250 of latch spring 120. Receptacle 300 may be formed from a portion of elongate body 290 that is offset from the surface of the body that attaches to rail assembly 160.

FIG. 2 shows latch assembly 100 with lever 110 in a latched position and latch spring 120 in an engaged position. Engaging end 250 of latch spring 120 is engaged with receptacle 300 of catch 130. Lever 110 is in the latched, upright position so that paddle 220 is below and inboard of offset surface 280 of engaging end 250. Because catch 130 is attached to rail assembly 160 (omitted for clarity) the engagement of latch spring 120 and catch 130 limits the movement of chassis 140 relative to rail assembly 160 so that component 150 can not be removed from rack 170 (omitted for clarity).

FIG. 3 shows latch assembly 100 with lever 110 in an unlatched position and latch spring 120 in a disengaged position. Lever 110 has been rotated about an axis to an unlatched, extended position. As lever 110 is rotated, paddle 220 moves upward and engages disengaging surface 270 of engaging end 250. As paddle 220 moves along the disengaging surface 270, latch spring 120 flexes and engaging end 250 is moved inboard toward chassis 140 in a direction parallel to the axis about which lever 110 rotates and out of engagement with receptacle 300 of catch 130.

With lever 110 in the unlatched, extended position, paddle 220 maintains engaging end 250 of latch spring 120 in a position inboard and disengaged from catch 130. Once in the unlatched position, chassis 140 can move relative to rail assembly 160 (omitted for clarity) and component 150 can be removed from rack 170 (omitted for clarity). In certain embodiments, a stopping surface on chassis 140 or bezel 180 may limit the rotation of lever 110, such as by engaging paddle 220, in order to prevent over-rotation of lever 110.

FIG. 4 shows latch 100 in an installation position. Lever 110 is in the upright position and engaging end 250 is urged to an outboard position by latch spring 120. Chassis 140 is extended from rack 170 but is partially engaged with rail assembly 160 (omitted for clarity). As chassis 140 is pushed into rack 170 (omitted for clarity), latch spring 120 is displaced inboard as engaging end 250 passes over the catch 130. The inboard displacement is generated by the interface of catch 130 and inclined engaging surface 260. As chassis 140 is fully seated in rack 170, engaging end 250 engages receptacle 300 and latch 100 is in the latched position, as shown in FIG. 2. In embodiments including torsion spring 230, when lever 110 is released torsion spring 230 returns the lever to the upright position and the latch spring 120 returns to the outboard position and chassis 140 will automatically lock into rack 170 when it is pushed in and fully seated.

In certain embodiments where latch spring 120 may have an engaging end 250 without an engaging surface 260, lever 110 may be in the extended position during installation of chassis 140 into rack 170. In the extended position, paddle 220 engages disengaging surface 270 of engaging end 250 and moves engaging end 250 inboard so that it will pass the front of catch 130. Once, chassis 140 is fully engaged, lever 110 is moved to the upright position and engaging end 250 engages receptacle 300.

In the embodiments shown, the movement of latch spring 120 is achieved by applying a force to the inclined surface of engaging end 250. The inclination of the surface may be selected so as to minimize the forces needed to impart motion onto the latch spring. In alternate embodiments, other arrangements and mechanisms may also, or in the alternative, be employed to impart motion onto latch spring 120. For example, the paddle or the catch could have inclined surfaces that engage and move a latch spring that may or may not also have inclined surfaces. Similarly, curved surfaces could also be utilized to impart motion to the latch spring.

The above discussion is meant to be illustrative of the principles and various embodiments of the present invention. Numerous variations and modifications will become apparent to those skilled in the art once the above disclosure is fully appreciated. For example, the latch could have alternate orientations other than those shown, such the latch is on the top or bottom of a component as opposed to on the side. It is intended that the following claims be interpreted to embrace all such variations and modifications.

What is claimed is:

1. A latch assembly to connect a component to a rack, the assembly comprising:
    a latch spring attached to a component and moveable between an engaged and a disengaged position, wherein in the engaged position said latch spring is engaged with a catch that is attached to a rack and in the disengaged position said latch spring is disengaged from the catch; and
    a lever rotatably mounted to the component and rotatable about an axis of rotation between a latched position and an unlatched position, wherein rotation of said lever from the latched position to the unlatched position moves said latch spring from the engaged position to the disengaged position in a direction parallel to the axis of rotation and;
    wherein the latch spring further comprises:
        a fixed end attached to the component;
        a spring body extending from said fixed end at an angle to the component; and
        an engaging end disposed on said spring body opposite said fixed end, with a disengaging surface extending from and at an angle to said spring body, and with an offset surface extending from and at an angle to said disengaging surface, wherein said engaging end is operable to engage the catch.

2. The latch assembly of claim 1 wherein said offset surface is parallel to said fixed end.

3. The latch assembly of claim 1 wherein said engaging end further comprises an engaging surface extending from said offset surface in a direction toward said fixed end.

4. The latch assembly of claim 1 further comprising a receptacle disposed on the catch and sized so as to receive one end of said latch spring.

5. The latch assembly of claim 1 wherein the catch is connected to a rail assembly that is connected to the rack.

6. The latch assembly of claim 1 wherein said lever further comprises:
    a body having a longitudinal axis;
    an axle extending from said body and rotatably connected to the component;
    a paddle extending from said body in a direction perpendicular to the longitudinal axis of said body.

7. The latch assembly of claim 6 wherein said paddle is operable to maintain said latch spring in the disengaged position when said lever is in the unlatched position.

8. The latch assembly of claim 1 wherein said lever rotates approximately 90 degrees between the latched and unlatched positions.

9. The latch assembly of claim 8 further comprising a torsion spring operable to urge said lever to the latched position.

10. A method for interfacing a component with a rack, the method comprising:
    engaging a latch spring attached to the component with a catch attached to the rack;
    disengaging the latch spring from the catch by rotating a component mounted lever about an axis from a latched position to an unlatched position, wherein a torsion spring urges the lever to the latched position, and wherein the latch spring is disengaged by a paddle disposed on the lever engaging a disengaging surface of the latch spring so as to move the latch spring in a direction parallel to the axis and out of engagement with the catch; and
    sliding the component at least partially out of the rack.

11. The method of claim 10 further comprising rotating the lever to an unlatched position wherein the paddle disengages from the disengaging surface.

12. The method of claim 11 further comprising sliding the component back into the rack such that an engaging surface of the latch spring contacts the catch and urges the latch spring to a position that allows the latch spring to engage the catch.

* * * * *

UNITED STATES PATENT AND TRADEMARK OFFICE
CERTIFICATE OF CORRECTION

PATENT NO. : 7,134,802 B2 Page 1 of 1
APPLICATION NO. : 10/828604
DATED : November 14, 2006
INVENTOR(S) : Alan B. Doerr et al.

It is certified that error appears in the above-identified patent and that said Letters Patent is hereby corrected as shown below:

On the face page, in field (73), in "Assignee", in column 1, line 2, delete "LP." and insert -- L.P. --, therefor.

Signed and Sealed this

Eleventh Day of August, 2009

David J. Kappos
*Director of the United States Patent and Trademark Office*